(12) United States Patent
Lin et al.

(10) Patent No.: US 6,204,940 B1
(45) Date of Patent: Mar. 20, 2001

(54) DIGITAL PROCESSING OF SCANNED NEGATIVE FILMS

(75) Inventors: Qian Lin, Santa Clara; Malcolm Rix, San Diego; Daniel R. Tretter, Mountain View, all of CA (US); Michael Stokes, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/080,054

(22) Filed: May 15, 1998

(51) Int. Cl.[7] .................................................. G03F 3/10
(52) U.S. Cl. .................. 358/527; 358/506; 358/518; 358/523; 382/167
(58) Field of Search ..................... 358/527, 506, 358/509, 516, 504, 505, 515, 518, 521, 523, 530, 537; 382/274, 162, 167

(56) References Cited

U.S. PATENT DOCUMENTS

| | | | |
|---|---|---|---|
| 5,329,383 | * | 7/1994 | Collette ................................ 358/500 |
| 5,447,811 | * | 9/1995 | Buhr et al. .............................. 430/20 |
| 5,499,044 | * | 3/1996 | Collette ................................ 347/232 |
| 5,724,456 | * | 3/1998 | Boyack et al. ........................ 382/274 |
| 5,781,315 | * | 7/1998 | Yamaguchi ........................... 358/520 |
| 5,956,044 | * | 9/1999 | Giorgianni et al. .................. 345/431 |
| 5,978,106 | * | 11/1999 | Hayashi ................................ 358/518 |

* cited by examiner

Primary Examiner—Edward L. Coles
Assistant Examiner—Mark Wallerson

(57) ABSTRACT

A process and apparatus is described to improve the digital processing of scanned negative films by reducing the amount of time necessary to perform the process and by increasing the robustness and quality of the images produced. These benefits are achieved by a process of color inversion, white point and black point mapping, and midtone adjustment. White and black mapping increases the dynamic range of the image, as well as removes the color cast of the negative film. A backlit image postprocessing algorithm can be employed which uses heuristics to identify backlighted situations, which are then brightened using a nonlinear power mapping. A midtone adjustment can include the sub-steps of contrast reduction and color adjustment. Contrast reduction reverses the film exposure characteristics. Color adjustment removes the remaining color cast in the midtone region of the image, and obtains the correct brightness. Starting from images with poor contrast and color cast, the system automatically looks for the appropriate correction parameters to produce images with vivid color and good contrast. This is achieved without rescanning or retaking the picture. One implementation, using one dimensional look-up-tables, is very efficient.

22 Claims, 8 Drawing Sheets

DIGITAL PROCESSING OF SCANNED NEGATIVE FILMS

BACKGROUND OF THE INVENTION

1. Field of the Invention

The present invention relates to digital image processing and, more particularly, to processing scanned negative films.

2. Description of the Related Art

Systems are known in the art which can scan photos, negatives, and slides into a PC so that the images can be displayed or printed. For example, one such system is the HP PhotoSmart system (Hewlett-Packard Company, Palo Alto, Calif.) which includes the HP PhotoSmart Photo Scanner (part number C5100A) and the HP PhotoSmart Photo Printer (part number C3804A). The photo scanner is a quick and easy way to convert not only existing photographs, but also slides and negatives, to digital images. An operator merely inserts a photo, slide, or negative and the photo scanner automatically launches its software and displays a preview scan on the PC screen. Based on the finished photo size, the photo scanner's software chooses the optimum scanning resolution that will give professional photographic results and keep file size to a minimum.

In traditional analog photofinishing, a number of techniques have been developed by companies such as Kodak and Fuji to process color negatives. Some of the color balancing algorithms adjust image colors based on user preferences rather than actual scene colors. Also, some techniques try to determine the primary scene illuminant using a special sensor. The color images can then be color balanced based on this determination. Other systems rely on user intervention to correctly process the negatives.

Many digital film scanning systems used techniques based on those first developed for analog processing. However, these systems are often less robust than the analog systems they replace, because they attempt to operate without user intervention. Also, they cannot directly sense the film type automatically like the analog systems can. In fact, many digital film scanners give the best results if the user first enters the film type. This requires considerable expertise on the part of the user, and also typically requires a computer interface for enterring the information, so the scanner cannot easily be a standalone device.

Thus, although the scanning software can convert scanned negative film images to positive digital images, current state-of-the-art software is not as robust or easy to use as desired. Moreover, in order to calculate the positive digital image, such software often includes complex, time-consuming calculations.

Thus, it can be seen that current methods of digitally processing scanned negative films impose output speed and image fidelity limits upon image output devices, and hinder the use of these devices in many applications.

Therefore, there is an unresolved need for a technique that can improve the digital processing of scanned negative films by reducing the amount of time necessary to perform the process and by increasing the robustness and quality of the images produced.

SUMMARY OF THE INVENTION

A process and apparatus is described to improve the digital processing of scanned negative films by reducing the amount of time necessary to perform the process and by increasing the robustness and quality of the images produced. These benefits are achieved by a process of color inversion, white point and black point mapping, and midtone adjustment. White and black mapping increases the dynamic range of the image, as well as removes the color cast of the negative film. The black and white point mapping can result in a dark image when light sources, such as lit candles or incandescent bulbs, are visible in the scene. For one embidoment, a backlit image postprocessing algorithm is employed which uses heuristics to identify these situations, which are then brightened using a nonlinear power mapping.

For one embodiment, midtone adjustment includes the sub-steps of contrast reduction and color adjustment. Contrast reduction reverses the film exposure characteristics. Color adjustment removes the remaining color cast in the midtone region of the image, and obtains the correct brightness.

To summarize, starting from images with poor contrast and color cast, the system automatically looks for the appropriate correction parameters to produce images with vivid color and good contrast. This is achieved without rescanning or retaking the picture. The implementation, using one dimensional look-up-tables, is very efficient.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–6B. Those skilled in the art will readily appreciate that the detailed description given herein with respect to these figures is for explanatory purposes, however, because the invention extends beyond these limited embodiments.

Figure 1:
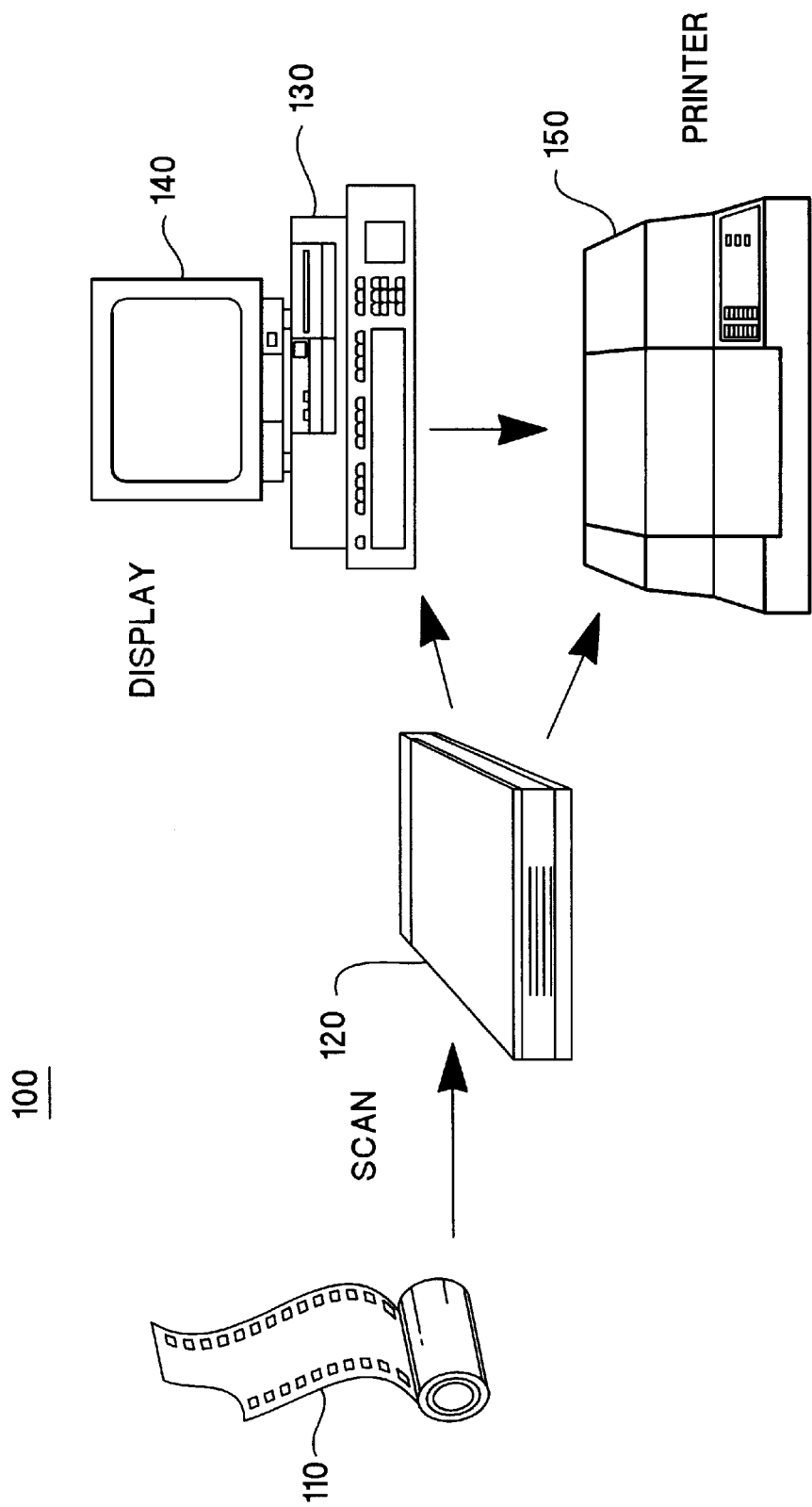
FIG. 1 is a drawing illustrating a system for photo processing of scanned negative films according to an embodiment of the present invention.

The following describes a method and apparatus for digital processing of scanned negative films. As the image quality of low cost printers improves, it becomes more attractive for amateur photographers to reprint and enlarge their favorite photos at home. FIG. 1 is a drawing illustrating a system 100 for photo processing of scanned negative films according to an embodiment of the present invention. Color negative film 110 is scanned by scanner 120. We propose a digital color processing technique for scanned negative images, so that the images can be saved (e.g., on PC 130), displayed on monitor 140, or color hard copies can be produced using digital color printer 150. Although the system 100 is shown as including discrete components, for an alternate embodiment the discrete embodiments (or a subset thereof) can be combined into an integral unit.

Our process and apparatus improves the digital processing of scanned negative films by reducing the amount of time necessary to perform the process and by increasing the robustness and quality of the images produced. These benefits are achieved by a process of color inversion, white point and black point mapping, and midtone adjustment. White and black mapping increases the dynamic range of the image, as well as removes the color cast of the negative film. The black and white point mapping can result in a dark image when light sources, such as lit candles or incandescent bulbs, are visible in the scene. For one embodiment, a backlit image postprocessing algorithm is employed which uses heuristics to identify these situations, which are then brightened using a nonlinear power mapping.

For one embodiment, midtone adjustment includes the sub-steps of contrast reduction and color adjustment. Contrast reduction reverses the film exposure characteristics. Color adjustment removes the remaining color cast in the midtone region of the image, and obtains the correct brightness.

The process to convert the raw samples of the negative film to a color image can either occur in the scanner, or in the computer. Furthermore, the technique described can be implemented in hardware, software or firmware. Moreover, the process can be implemented in any of the components of the system. Alternately, the process can be distributed throughout the system with individual portions of the process implemented in separate system components.

Figure 2:
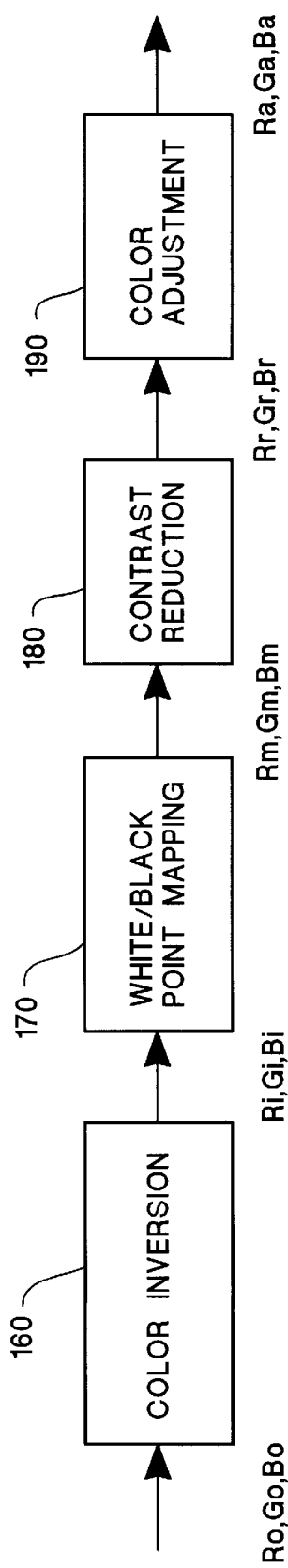
FIG. 2 is a block diagram illustrating photo processing of scanned negative films according to an embodiment of the present invention.

FIG. 2 is a block diagram illustrating photo processing of scanned negative films according to an embodiment of the present invention. The pipeline consists of the following blocks: color inversion 160, white point and black point mapping 170, contrast reduction 180, and color adjustment 190. Although the pipeline is depicted as following a particular sequence, it is to be understood that, for an alternate embodiment, a different sequence can be employed. For example, color adjustment could be performed before contrast reduction.

For one embodiment, our negative processing pipeline consists of four stages; one adapts to the image data, while the other three are fixed lookup tables. We also implement a separate postprocessing step that adjusts for dark and backlit images. FIG. 2 illustrates the four processing steps in the pipeline. The graphs all assume 8-bit per color plane scan data; axis numbers need to be scaled for other bitdepths. The first stage is a simple inversion step, converting the scanned image from a negative to a positive. The input/output characteristic shown in FIG. 2 is applied to all three scanned colors.

Suppose the original raw samples of a negative film from a digital film scanner are represented by the red, green, and blue components, $R_o(k, l)$, $G_o(k, l)$, and $B_o(k, l)$, where $0 \leq k < K$, $0 \leq l < L$, and K, L are the number of rows and columns of the negative image, respectively. $R_o(k, l)$, $G_o(k, l)$, and $B_o(k, l)$ typically have maximum value of 255, which represents maximum intensity, and minimum value of 0, which represents minimum intensity. Although a 24-bit color pixel will be used throughout the description, alternate color representations can be used. For example, if a 30-bit color pixel is used, then the maximum value would be 1023 (instead of 255).

Figure 3:
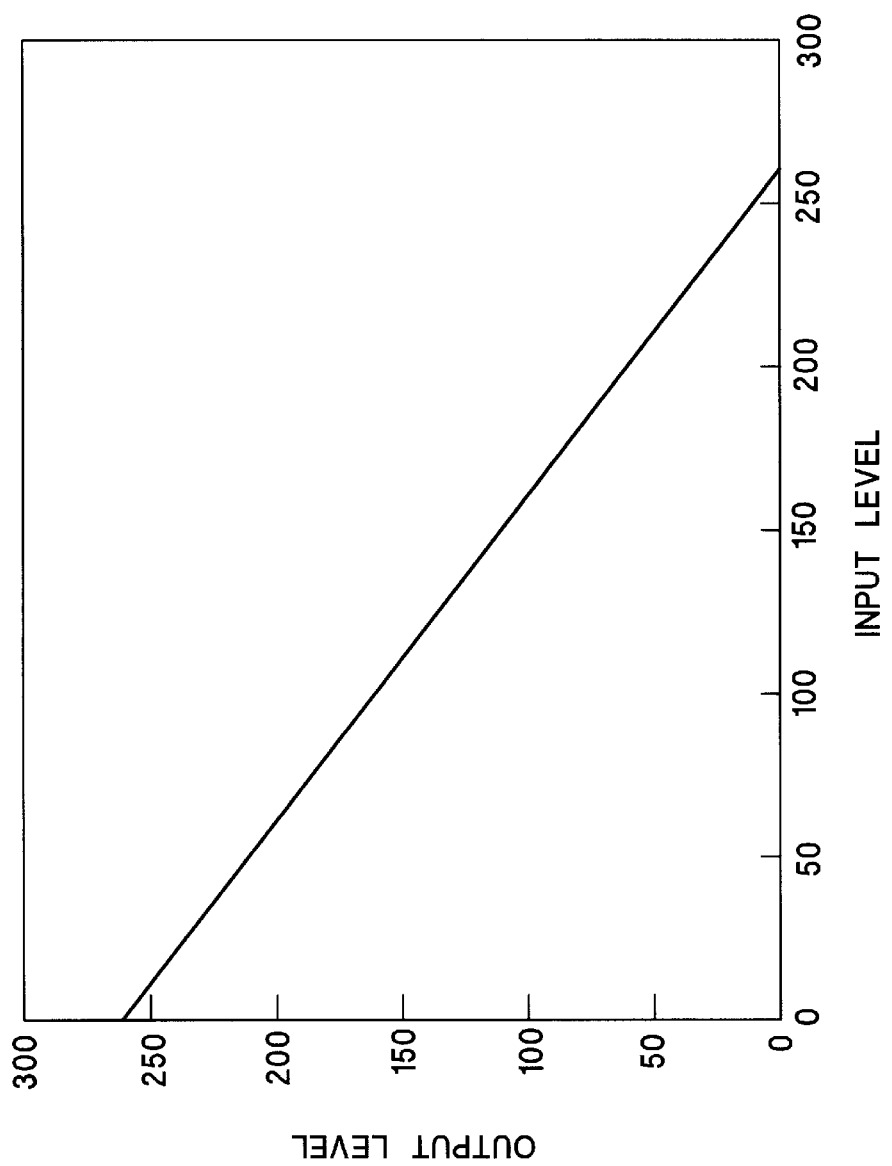
FIG. 3 is a diagram illustrating color inversion according to an embodiment of the present invention.

The image on a photographic negative is inverted, so dark image regions look lighter and vice versa. Thus, to get a color image suitable for viewing or printing, we first perform a color inversion. FIG. 3 is a diagram illustrating color inversion according to an embodiment of the present invention. This embodiment of color inversion can be described mathematically as $$R_i(k, l) = \text{Max} - R_o(k, l)$$

$$G_i(k, l) = \text{Max} - G_o(k, l)$$

$$B_i(k, l) = \text{Max} - B_o(k, l)$$

where Max=255.

The purpose of the white and black mapping process is to increase the dynamic range of the image, as well as to remove the color cast of the negative film. The second pipeline stage remaps the white and black point of the image based on the red, green, and blue histograms. This mapping function is therefore adaptive, adjusting to the measured image statistics. The operation remaps the image data. Using the red, green, and blue histograms, a bounding box is constructed containing the scanned data values. The data is then remapped to fill the entire RGB cube. The identification of white and black points is described in Qian Lin, "Automatic Color Processing to Correct Hue Shift and Incorrect Exposure", European patent application number 96305860.7, publication number EP 0 762 736. In its simplest form, this amounts to setting the maximum red, green, and blue (R, G, and B) values to the white point and the minimum values to the black point.

$$\{R_{MAX}, G_{MAX}, B_{MAX}\} => \text{White}$$

$$\{R_{MIN}, G_{MIN}, B_{MIN}\} => \text{Black}$$

This remapping of the white and black points helps adjust for both scene illumination and mask density of the negative. The procedure assumes that the minimum and maximum scene reflectances are indicative of white and black points. It also assumes that only reflected light is in the scene. Any light sources or fluorescent objects can result in a color cast to the image or in an image that is too dark. Finally, if the absolute maximum and minimum measured values are used for white and black points, any noise in the image, including that due to dust or scratches on the negative film, can cause errors in the remapping.

We alleviate some of these potential problems by implementing a more robust form of the white and black point adjustment. White and black point estimation in the presence of noise is improved by using red, green, and blue values that are somewhat below the absolute maximum and above the absolute minimum. For example, we can map the 95th percentile R, G, and B values to white and the 5th percentile values to black. This eliminates outliers due to noise.

On the other hand, the distribution of the white points allows us to make the white point identification process more robust. This can be accomplished, for example, by checking the color of each image point and throwing out those that clearly are not potential white points in the histogram building stage. In one of the photos taken in a nightclub with neon lights in the background, for example, the bright red neon lights biased the white point toward the red color. Hence the image appeared greenish. With the more robust estimation, the image became much more natural. For example, in the L*a*b*, robustness of the white point estimation is improved by only counting pixels with a*<0 and b*<0 in the histogram building process.

The white point computed for an image can result in an undesirable color cast or underexposure if the scene contains light sources or fluorescent objects. Color casts can be reduced by identifying when the computed white point lies outside of some expected range of values. Although the white point can vary considerably from image to image, a large number of processed images can be used to compute a distribution of likely white point values. If the computed white point for a particular image lies far enough outside this distribution, we adjust the value to pull it in closer to the expected range before remapping the data.

If the white and black points are remapped so the bounding box expands to fill the entire RGB cube, detail can be lost in the highlight and shadow regions of the image. The highlights will be pushed into saturation, while shadow regions will have remapped pixel values very near zero. In order to prevent this phenomenon, which is sometimes referred to as "blowing out" the highlights, our remapping function contains soft shoulders. The bounding box is expanded to fill most of the RGB cube, but a small set of overload values is left around all sides. These values are used to represent the highlights and shadows that would otherwise be clipped. A one dimensional representation of this soft shoulders technique is given in FIG. 4A.

Figure 4A:
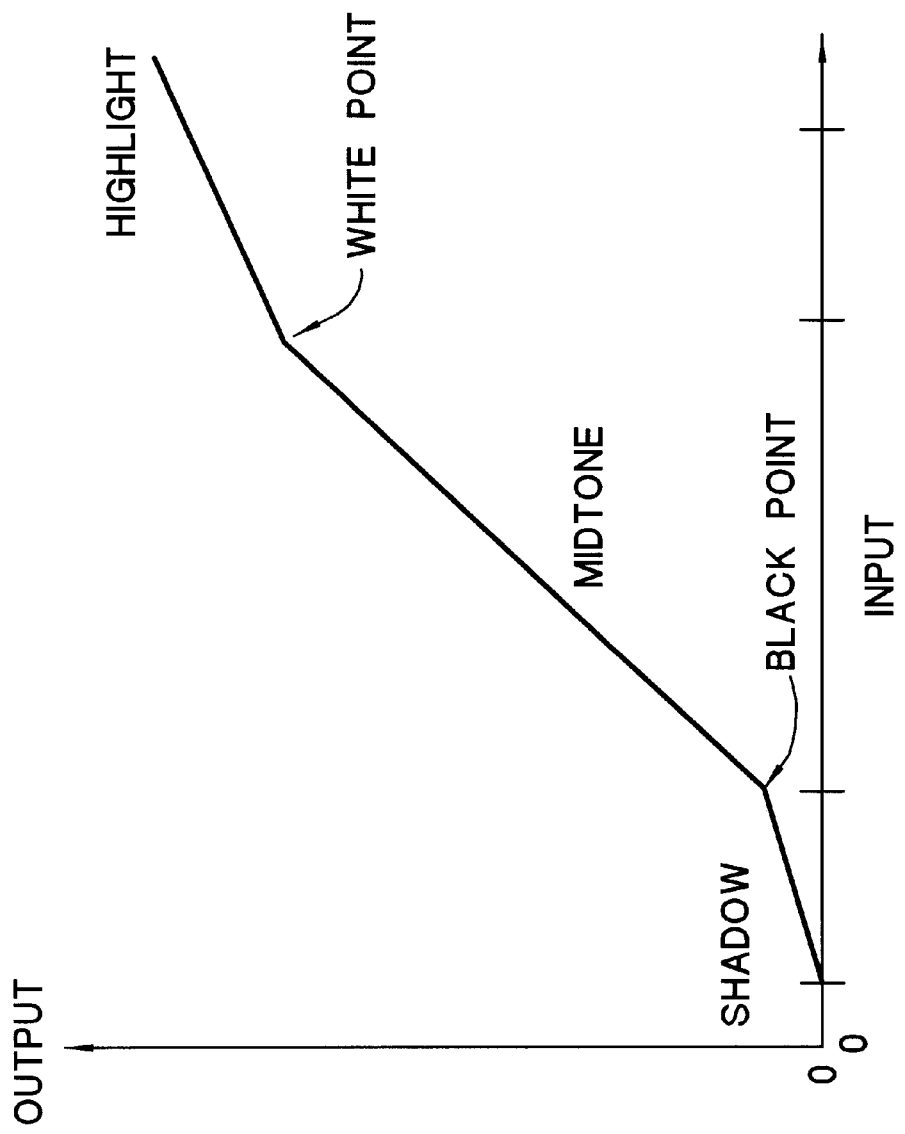
FIG. 4A is a diagram illustrating white and black point mapping according to an embodiment of the present invention.
Figure 4B:
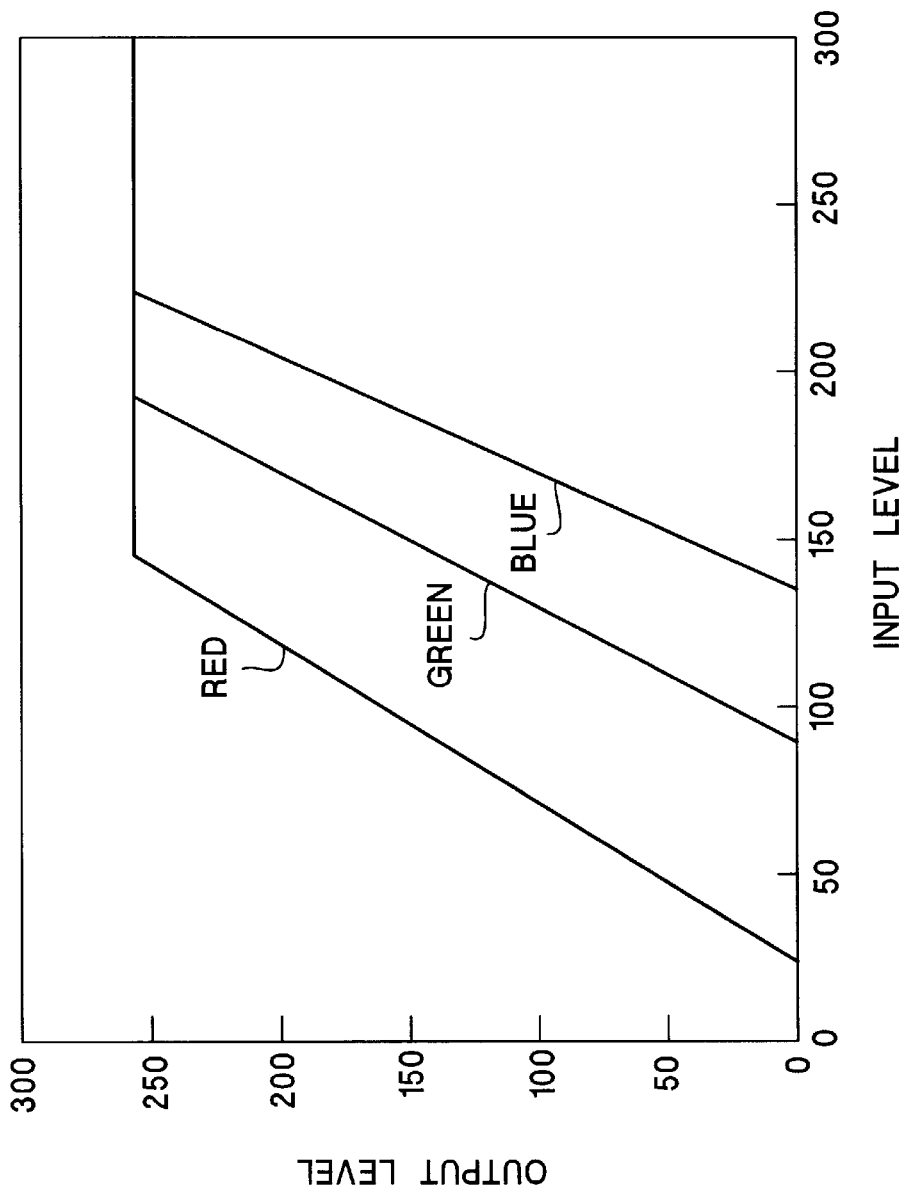
FIG. 4B is a diagram illustrating white and black point mapping according to anonther embodiment of the present invention.

FIG. 4B is a diagram illustrating white and black point mapping according to another embodiment of the present invention. This can be summarized as follows: let the white point be $R_w$, $G_w$, and $B_w$, and the black point be $R_k$, $G_k$, and $B_k$; the white and black mapping is $$R_m(k, l) = \text{Max} \times \frac{R_i(k, l) - R_k}{R_w - R_k};$$

$$G_m(k, l) = \text{Max} \times \frac{G_i(k, l) - G_k}{G_w - G_k};$$

$$B_m(k, l) = \text{Max} \times \frac{B_i(k, l) - B_k}{B_w - B_k};$$

Figure 5:
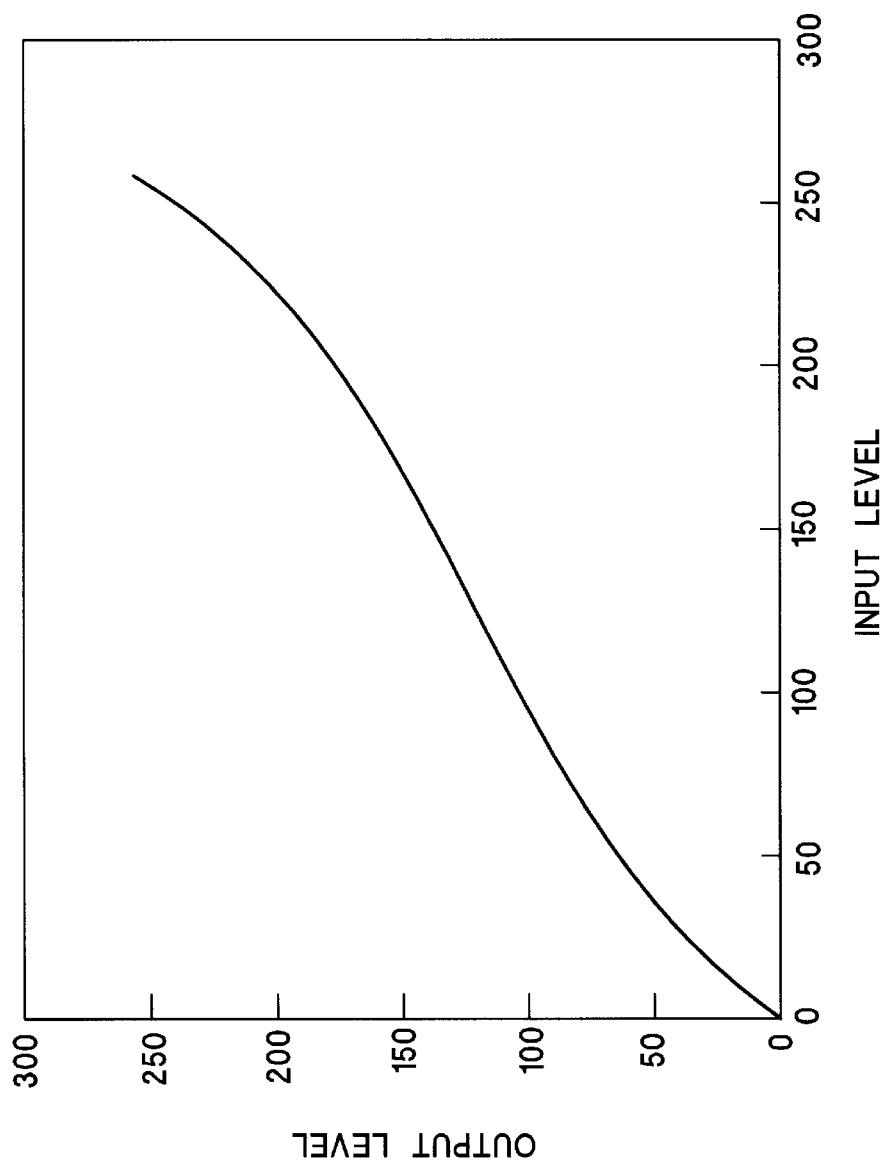
FIG. 5 is a diagram illustrating contrast reduction according to an embodiment of the present invention.

Typically, the white and black mapping will vary with each negative scanned. The white and black point mapping is followed by two stages that adjust the image midtone characteristics, as shown in FIG. 2. FIG. 5 is a diagram illustrating contrast reduction according to an embodiment of the present invention. The purpose of contrast reduction is to "undo" the film exposure characteristics (See, R. W. G. Hunt, *The Reproduction of Colour in Photography, Printing and Television*, Fountain Press, England, 1987). The contrast adjustment step applies a nonlinear remapping function to all three color planes. This function is designed to adjust for some of the nonlinear characteristics of the negative. For one embodiment, we use a parameterized set of inverse sigmoidal functions for contrast adjustment. If the input range x between shadow and highlight regions is normalized to [0, 1], the function takes the form:

$$y = 0.5(2x)^{\gamma_c}$$

if $x \leq 0.5$ $$y = 1 - 0.5(2 - 2x)^{\gamma_c}$$

if $x > 0.5$

The parameter $\gamma_c$ is determined experimentally.

The important characteristic is the inverse sigmoidal shape (contrast reducing characteristic) of the curve, not the exact equation. For another embodiment, contrast reduction can be represented as $$R_r(k, l) = \frac{\text{Max}}{2} \times \frac{(R_m(k, l))\gamma_c}{(\text{Max}/2)}, \quad \text{if } R_m(k, l) \leq \text{Max}/2$$

$$R_r(k, l) = \text{Max} - \frac{\text{Max}}{2} \times \frac{(R_m(k, l))\gamma_c}{(\text{Max}/2)}, \quad \text{if } R_m(k, l) > \text{Max}/2$$

$$G_r(k, l) = \frac{\text{Max}}{2} \times \frac{(G_m(k, l))\gamma_c}{(\text{Max}/2)}, \quad \text{if } G_m(k, l) \leq \text{Max}/2$$

$$G_r(k, l) = \text{Max} - \frac{\text{Max}}{2} \times \frac{(G_m(k, l))\gamma_c}{(\text{Max}/2)}, \quad \text{if } G_m(k, l) > \text{Max}/2$$

$$B_r(k, l) = \frac{\text{Max}}{2} \times \frac{(B_m(k, l))\gamma_c}{(\text{Max}/2)}, \quad \text{if } B_m(k, l) \leq \text{Max}/2$$

$$B_r(k, l) = \text{Max} - \frac{\text{Max}}{2} \times \frac{(B_m(k, l))\gamma_c}{(\text{Max}/2)}, \quad \text{if } B_m(k, l) > \text{Max}/2$$

where the exponent $\gamma_c$ is a parameter adjusted experimentally. Preferably, $\gamma_c$ is dependent on the scanning device, but independent of images.

Finally, the color balance is adjusted in the midtone regions. The purpose of color adjustment is to remove the remaining color cast in the midtone region of the image, and to obtain the correct brightness. For the midtone adjustment stage (which we implement as contrast reduction and color adjustment), we basically adjust for film nonlinearities and to properly map the neutral gray axis. The idea here is that black and white may be correct, but grays can still be off due to further nonlinearities in film and developing. We can use contrast reduction to adjust for film nonlinearities, which is a single curve applied to all three color planes. Color adjustment curves correct to properly map the neutral gray axis. This requires separate curves for each color plane (red, green and blue).

The three preceding processing stages can all be incorporated into a set of three one dimensional lookup tables, one for each color plane. For one embodiment, the curves corresponding to these lookup tables will be rotated clockwise by 45 degrees, added to a midtone adjustment curve, and rotated back 45 degrees counterclockwise. This procedure is illustrated for a single color plane in FIG. 6A. Our midtone adjustment curves are computed as $$y = \beta \sin^2(\pi x),$$

where the input range is again normalized to [0, 1], and the parameter $\beta$ is determined experimentally for each color plane. The midtone adjustment will balance the colors in the midtone regions to remove color casts along the neutral axis.

The midtone color adjustments are computed by rotating the input/output characteristic to horizontal, adding an adjustment function, and rotating back.

The entire pipeline of FIG. 2 can be computed as a single image dependent input/output lookup table for each color plane.

Figure 6A:
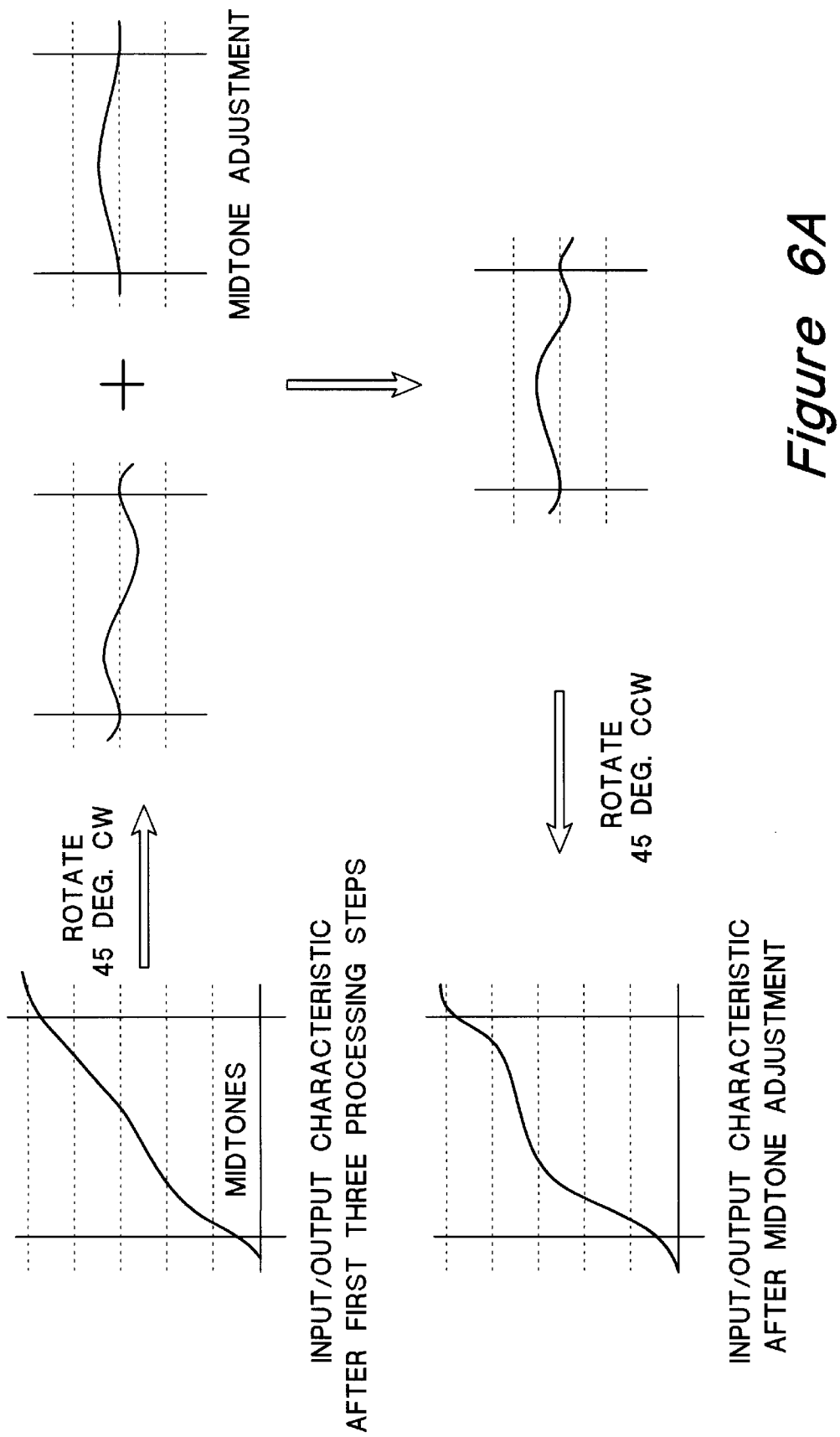
FIG. 6A is a diagram illustrating color adjustment according to an embodiment of the present invention.
Figure 6B:
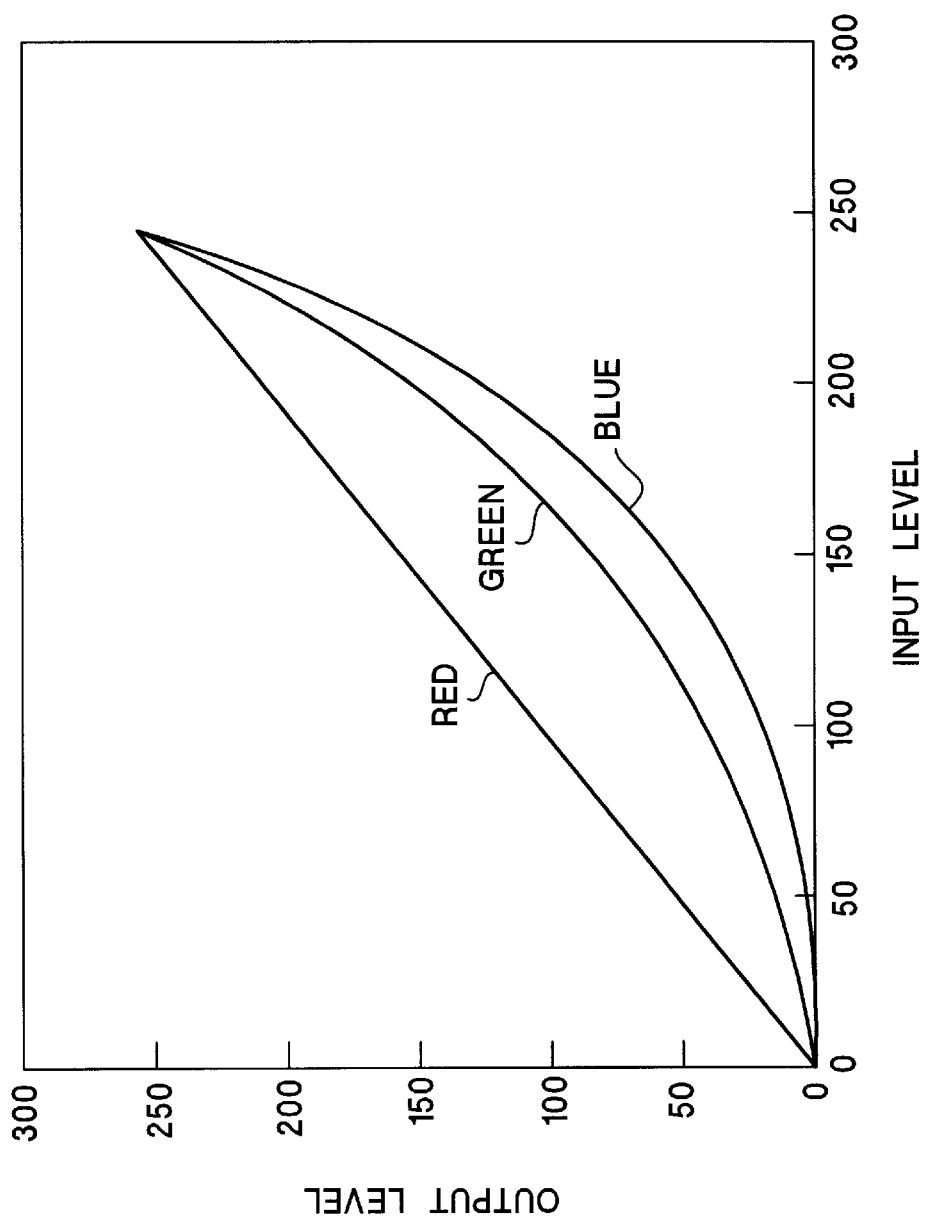
FIG. 6B is a diagram illustrating color adjustment according to another embodiment of the present invention.

For the color adjustment curve, like the others, equations are not as important as concepts. We use a $\sin^2$ function, but the "unimodal" shape is what is important. By "unimodal", we mean that the curve intersects with a line at its endpoints so that the curve is either completely above, or completely below the line (i.e., when the line is rotated to horizontal). Note that if the curve is a line, no color adjustment is made. It could be the case, however, that no color adjustment would be made in one, or more color channels. FIG. 6B is a diagram illustrating color adjustment according to another embodiment of the present invention. Color adjustment can be obtained by $$R_a(k, l) = \text{Max} \times \frac{(R_r(k, l))\gamma_r}{(\text{Max})}$$

$$G_a(k, l) = \text{Max} \times \frac{(G_m(k, l))\gamma_g}{(\text{Max})}$$

$$B_a(k, l) = \text{Max} \times \frac{(B_m(k, l))\gamma_b}{(\text{Max})}$$

where exponents $\gamma_r$, $\gamma_g$, $\gamma_b$, are parameters adjusted experimentally. They are typically dependent on the scanning device, but independent of images.

For one embodiment, color adjustment is the final step before printing or display. Alternately, to compensate for artifacts introduced by backlit images, a postprocessing step can be added prior to printing or display.

Backlit images most often occur when the sky is in the background, and the foreground is not well lit. This can occur, for example, when an indoor photo is taken with a window to the outside somewhere in the scene or when an outdoor photo is taken with the foreground (often people) in shadow and the background a bright sunlit scene. The black and white point mapping can result in a dark image when light sources, such as lit candles or incandescent bulbs, are visible in the scene. Our postprocessing algorithm uses heuristics to identify these situations, which are then brightened using a nonlinear power mapping.

We use a set of six scalar image statistics, $\eta_1, \ldots \eta_6$, to detect backlit and dark images. The statistics used by our heuristic algorithm are:

$\eta_1$=number of image pixels with R>200
$\eta_2$=number of image pixels with R, G, and B>200
$\eta_3$=number of image pixels with R<128
$\eta_4$=number of image pixels with R<128, G<0.8R and B<G
$\eta_5$=percentage of pixels along the edges of the image with R, G, and B>200
$\eta_6$=percentage of pixels along the edges of the image with R, G, and B<100

If $\eta_1$ is less than a set threshold, the image is classified as too dark. These images are brightened using a power function with the power factor determined from image histograms such that the average output median is mapped to half scale.

The heuristic used to determine a backlit image is somewhat more complicated. We assume a backlit image has a bright background and a dark foreground, both of which extend to the edges of the image. If $1.21\eta_2 > \eta_1$ and $10\eta_4 > \eta_3$, the image may be backlit. These conditions establish that the bright image regions are near neutral in color (like sky) and a significant percentage of the darker regions have a reddish tint (like skin tones). In addition to these conditions, we also require $\eta_5 > 15\%$ and $\eta_6 > 15\%$. This requirement guarantees that the bright and dark regions each extend to the image edges. If all of the above conditions are met, the image is classified as backlit. Backlit images are brightened using a standard gamma correction curve for a fixed preset gamma.

The proposed system has been tested on a collection of images and has been shown to be robust. To summarize, we start from images with poor contrast and color cast, the system automatically looks for the appropriate correction parameters to produce images with vivid color and good contrast. This is achieved without rescanning or retaking the picture. A very efficient implementation can be made using one dimensional look-up-tables.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A process for a scanned negative color image, the process comprising the steps of:

color inversion of the negative image;

white point and black point mapping; and midtone adjustment to form a positive image, wherein the step of midtone adjustment comprises the steps of contrast reduction and color adjustment; and wherein said contrast reduction step uses a curve having an inverse sigmoidal shape.

2. The process as set forth in 1, comprising the step of backlit image detection and adjustment.

3. The process as set forth in 2, wherein the color adjustment step uses a curve having a unimodal shape.

4. The process as set forth in 1, comprising the step of displaying the positive image.

5. The process as set forth in 1, comprising the step of printing the positive image.

6. The process as set forth in 1, wherein at least one of the steps is accomplished using a look-up table.

7. The process as set forth in 6, wherein the color adjustment step uses a curve having a unimodal shape.

8. The process as set forth in 1, wherein soft shoulders are used when white point and black point mapping.

9. The process as set forth in 8, wherein the color adjustment step uses a curve having a unimodal shape.

10. The process as set forth in 1, wherein the inverse sigmoidal shaped curve is dependent on the scanning device.

11. The process as set forth in 1, wherein color adjustment uses a curve having a unimodal shape for at least one color plane.

12. The process as set forth in 11, wherein the unimodal shaped curve is dependent on the scanning device.

13. The process as set forth in 1, wherein the color adjustment step uses a curve having a unimodal shape.

14. A processor for a scanned negative color image, the processor comprising:

a color inverter to perform color inversion of the negative image;

a mapper to perform white point and black point mapping; and a midtone adjuster to perform midtone adjustment to form a positive image, wherein the midtone adjuster comprises a contrast reducer to perform contrast reduction, and a color adjuster to perform color adjustment; and wherein the contrast reducer uses a curve having an inverse sigmoidal shape.

15. The processor as set forth in 14, comprising a backlight adjuster to perform backlit image detection and adjustment.

16. The processor as set forth in 14, comprising a display to display the positive image.

17. The processor as set forth in 14, comprising a printer to print the positive image.

18. The processor as set forth in 14, wherein at least one of the color inverter, mapper, and midtone adjuster uses a look-up table.

19. The processor as set forth in 14, wherein soft shoulders are used when white point and black point mapping.

20. The processor as set forth in 14 wherein the inverse sigmoidal shaped curve is dependent upon a scanning device.

21. The processor as set forth in 14 wherein the color adjuster uses a curve having a unimodal shape for at least one color plane.

22. The processor as set forth in 21, wherein the unimodal shaped curve is dependent on the scanning device.

* * * * *